United States Patent [19]

Takenaka et al.

[11] Patent Number: 6,134,305
[45] Date of Patent: Oct. 17, 2000

[54] INFORMATION PROCESSING SYSTEM INCLUDING A WORD PROCESSOR CAPABLE OF COMMUNICATING WITH FACSIMILE APPARATUS

[75] Inventors: Shunpei Takenaka, Yamato; Shoji Kanemura, Kawasaki, both of Japan

[73] Assignee: Canon Kabushiki Kaisha, Tokyo, Japan

[21] Appl. No.: 07/944,704

[22] Filed: Jan. 6, 1992

Related U.S. Application Data

[63] Continuation of application No. 07/427,995, Oct. 27, 1989, abandoned, which is a continuation of application No. 07/105,984, Oct. 7, 1987, abandoned, which is a continuation of application No. 06/781,320, Sep. 30, 1985, abandoned, which is a continuation of application No. 06/644,663, Aug. 27, 1984, abandoned, which is a continuation of application No. 06/299,577, Sep. 4, 1981, abandoned.

[30] Foreign Application Priority Data

Sep. 11, 1980 [JP] Japan ................................. 55-126586

[51] Int. Cl.⁷ ........................ H04M 11/00; G06F 15/177
[52] U.S. Cl. .............. 379/100.13; 358/400; 379/100.13; 709/220
[58] Field of Search ..................... 395/800, 200, 395/325, 651, 652, 835, 836; 358/400, 401, 402, 406, 442, 443, 425; 379/100.15, 93.09, 100.06, 100.01, 100.13, 100.16; 709/220

[56] References Cited

U.S. PATENT DOCUMENTS

| | | | |
|---|---|---|---|
| 3,558,811 | 1/1971 | Monfevecchio | 364/900 X |
| 3,582,886 | 6/1971 | Hardin et al. | 382/61 |
| 3,593,305 | 7/1971 | Hadley | 364/200 |
| 3,676,858 | 7/1972 | Finch et al. | 395/200.58 |
| 3,705,953 | 12/1972 | Lemelson | 358/257 |
| 3,751,582 | 8/1973 | Wernikoff et al. | 358/406 |
| 3,828,314 | 8/1974 | Owen et al. | 364/900 |
| 3,828,319 | 8/1974 | Owen | 364/900 |
| 3,830,962 | 8/1974 | Mailloux | 358/406 |
| 3,846,763 | 11/1974 | Riikonen | 364/200 |
| 3,927,394 | 12/1975 | Sugai et al. | 364/200 |
| 3,950,733 | 4/1976 | Chang et al. | 364/900 |
| 3,958,088 | 5/1976 | Vieri | 379/100 |
| 4,003,032 | 1/1977 | Austin et al. | 707/7 |
| 4,025,906 | 5/1977 | Riikonen | 395/836 |
| 4,058,838 | 11/1977 | Crager et al. | 358/257 |
| 4,110,823 | 8/1978 | Cronshaw et al. | 364/200 |
| 4,127,896 | 11/1978 | Raslavaky, III | 364/200 |
| 4,149,145 | 4/1979 | Hartke et al. | 358/263 X |
| 4,151,562 | 4/1979 | Tregay | 358/263 X |
| 4,153,916 | 5/1979 | Miwa et al. | 358/257 |
| 4,180,798 | 12/1979 | Komori et al. | 358/256 X |
| 4,208,677 | 6/1980 | Schayes et al. | 358/280 |
| 4,317,136 | 2/1982 | Keyt et al. | 358/257 X |
| 4,330,847 | 5/1982 | Kriseski | 364/900 |
| 4,386,416 | 5/1983 | Giltner et al. | 364/900 |

FOREIGN PATENT DOCUMENTS

| | | | |
|---|---|---|---|
| 2911204 | 10/1980 | Germany | 358/263 |
| 0146916 | 11/1979 | Japan | 358/263 |

OTHER PUBLICATIONS

"Guidance to Data Communication", no translation.

Primary Examiner—John Follansbee
Attorney, Agent, or Firm—Fitzpatrick, Cella, Harper & Scinto

[57] ABSTRACT

A word processor is capable of communicating with a remote facsimile apparatus and with a remote word processor. The word processor comprises a first processing unit for receiving and reproducing a facsimile signal and a second processing unit for receiving coded character data.

9 Claims, 8 Drawing Sheets

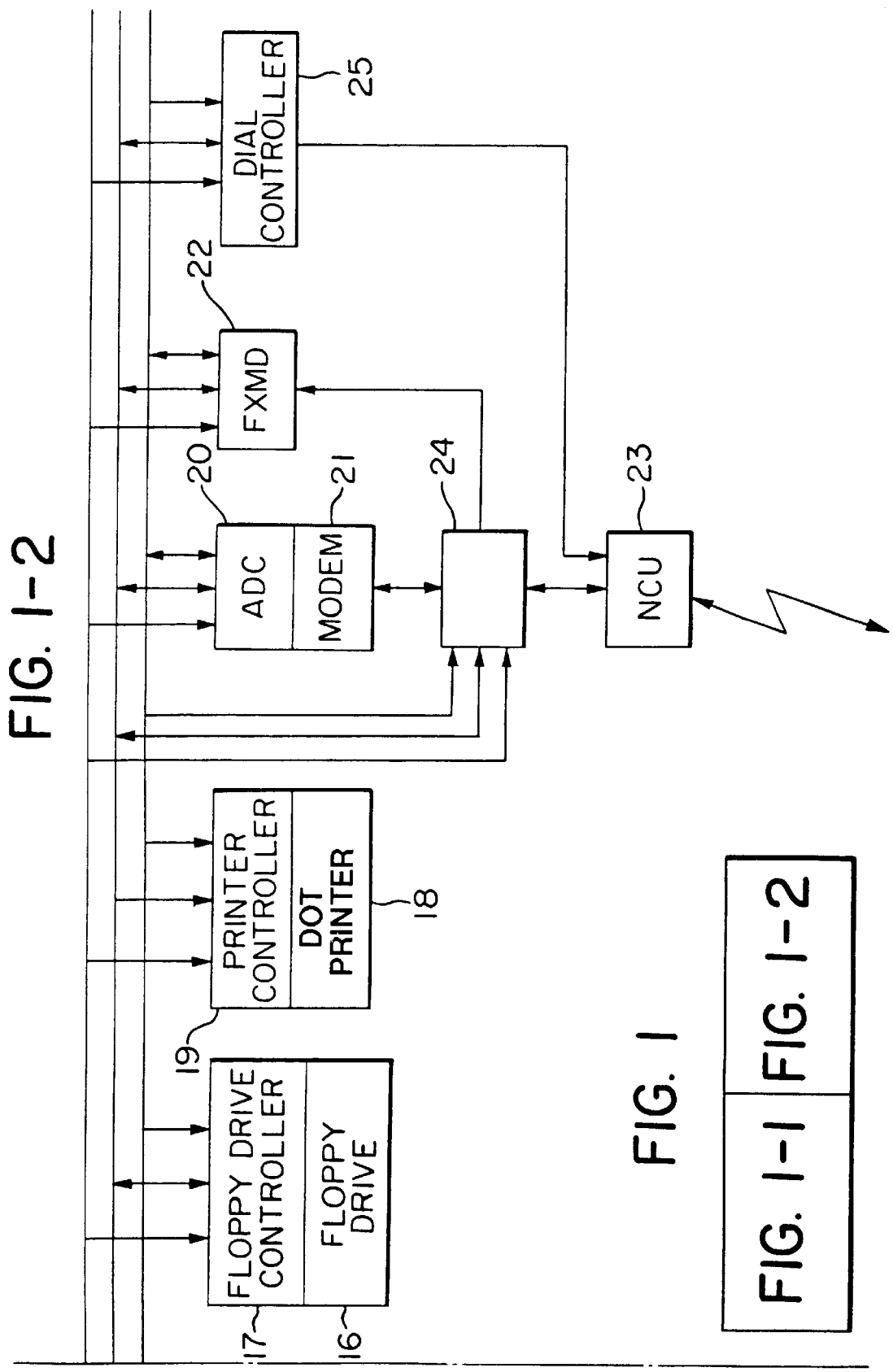

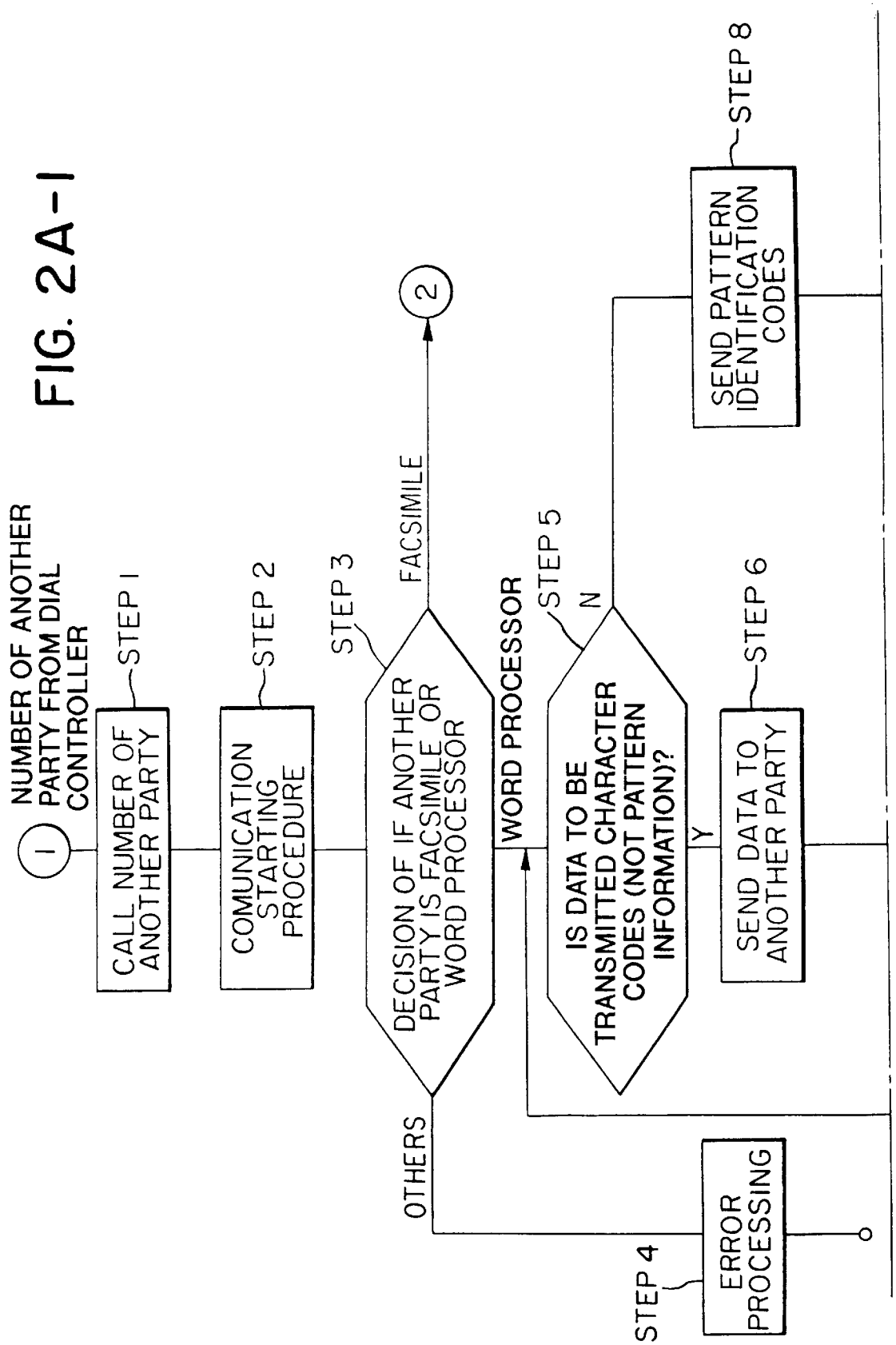

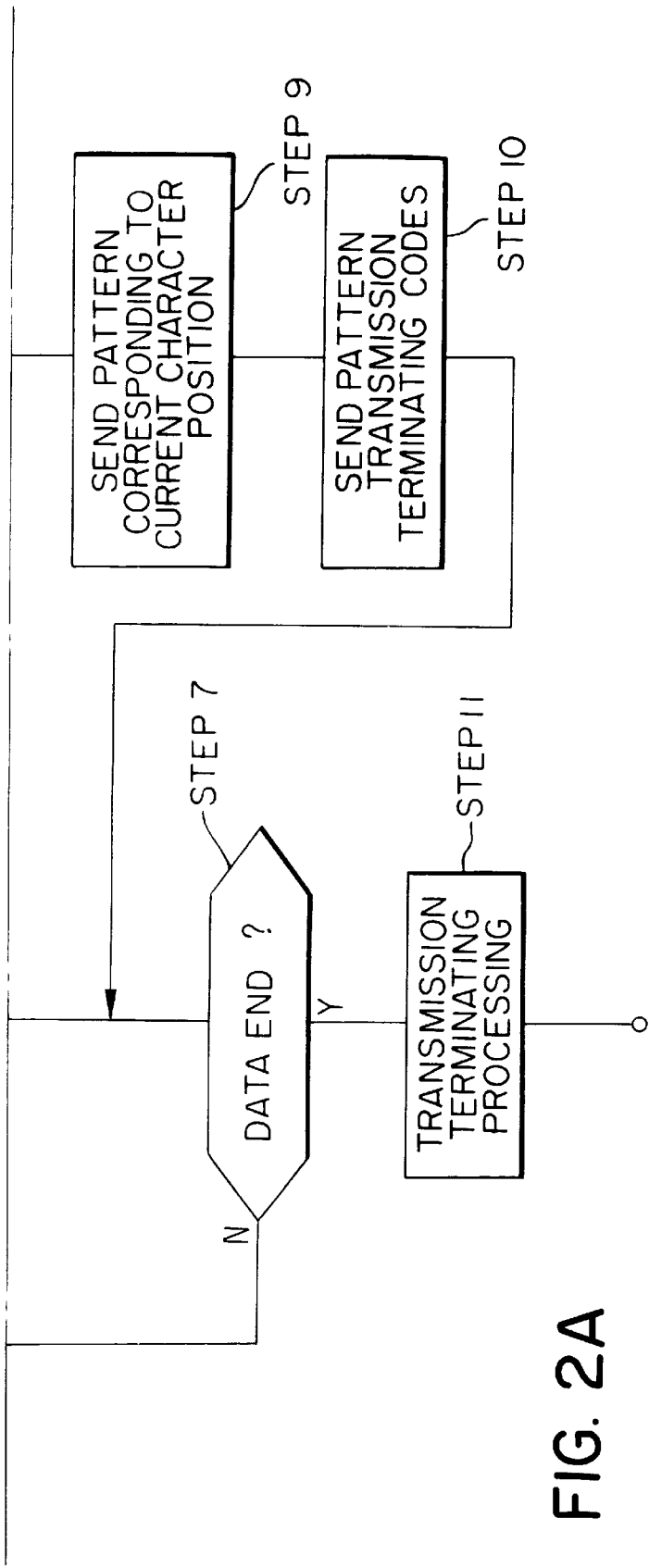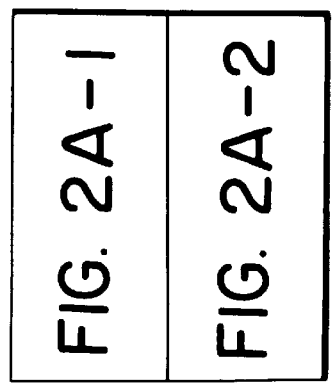

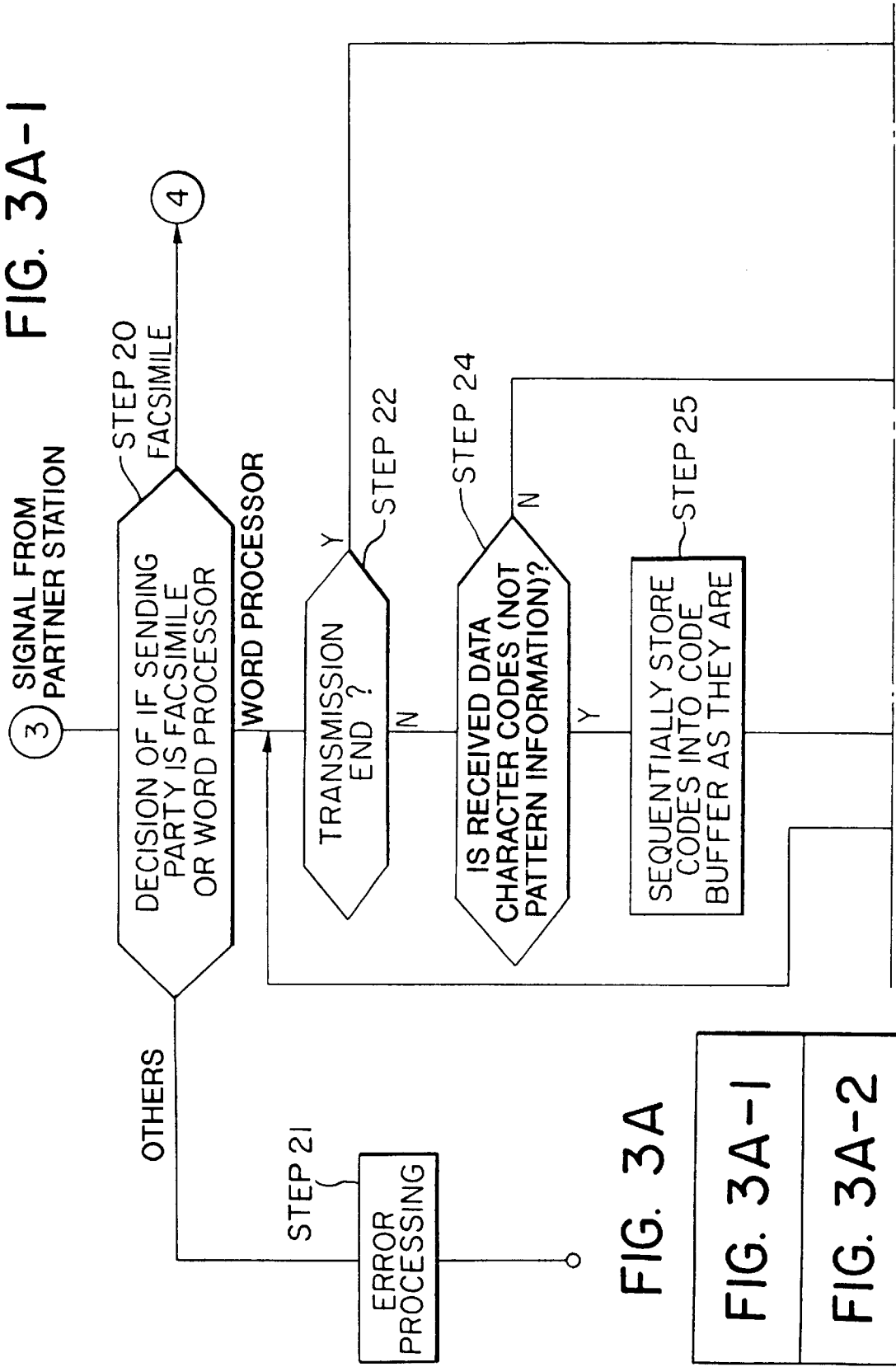

INFORMATION PROCESSING SYSTEM INCLUDING A WORD PROCESSOR CAPABLE OF COMMUNICATING WITH FACSIMILE APPARATUS

This application is a continuation of application Ser. No. 07/427,995 filed on Oct. 27, 1989, now abandoned, which in turn is a continuation of application Ser. No. 07/105,984 filed on Oct. 7, 1987, now abandoned, which in turn is a continuation of application Ser. No. 06/781,320 filed on Sep. 30, 1985, now abandoned, which in turn is a continuation of application Ser. No. 06/644,663 filed Aug. 27, 1984, now abandoned, which in turn is a continuation of application Ser. No. 06/299,577 filed on Sep. 4, 1981, now abandoned.

BACKGROUND OF THE INVENTION

1. Field of the Invention

The present invention relates to an information processing system, including a word processor having a transmitting/receiving function.

2. Description of the Prior Art

Known prior art information processing systems including, for instance facsimile apparatus communicate with other facsimile apparatus. Similarly, information processing systems are known in which word processors communicate with other word processors.

SUMMARY OF THE INVENTION

It is an object of the present invention to provide an information processing system in which, for example, a word processor is capable of communicating with a remote facsimile apparatus and a remote word processor.

It is another object of the present invention to provide an information processing system in which, for example, a word processor is capable of discriminating signals transmitted from a facsimile apparatus and another word processor.

It is a further object of the present invention to provide an information processing system in which, for example, a word processor is capable of transmitting a facsimile signal and a coded character signal.

It is a still further object of the present invention to provide an information processing system in which, for example, a word processor is capable of receiving signals from a facsimile apparatus and another character processor.

The above and other objects of the present invention will be apparent from the description of the preferred embodiment of the present invention taken in conjunction with the accompanying drawings.

BRIEF DESCRIPTION OF THE DRAWINGS

FIGS. 1-1 and 1-2 so arranged as shown in FIG. 1 show a block diagram of one embodiment of the present invention;

FIGS. 2A-1, 2A-2 and 2B show flow charts for a transmitting operation with FIGS. 2A-1 and 2A-2 being arranged as shown in FIG. 2A;

FIGS. 3A-1, 3A-2 and 3B show flow charts for a receiving operation with FIGS. 3A-1 and 3A-2 being arranged as shown in FIG. 3A.

DESCRIPTION OF THE PREFERRED EMBODIMENTS

Figure 1:
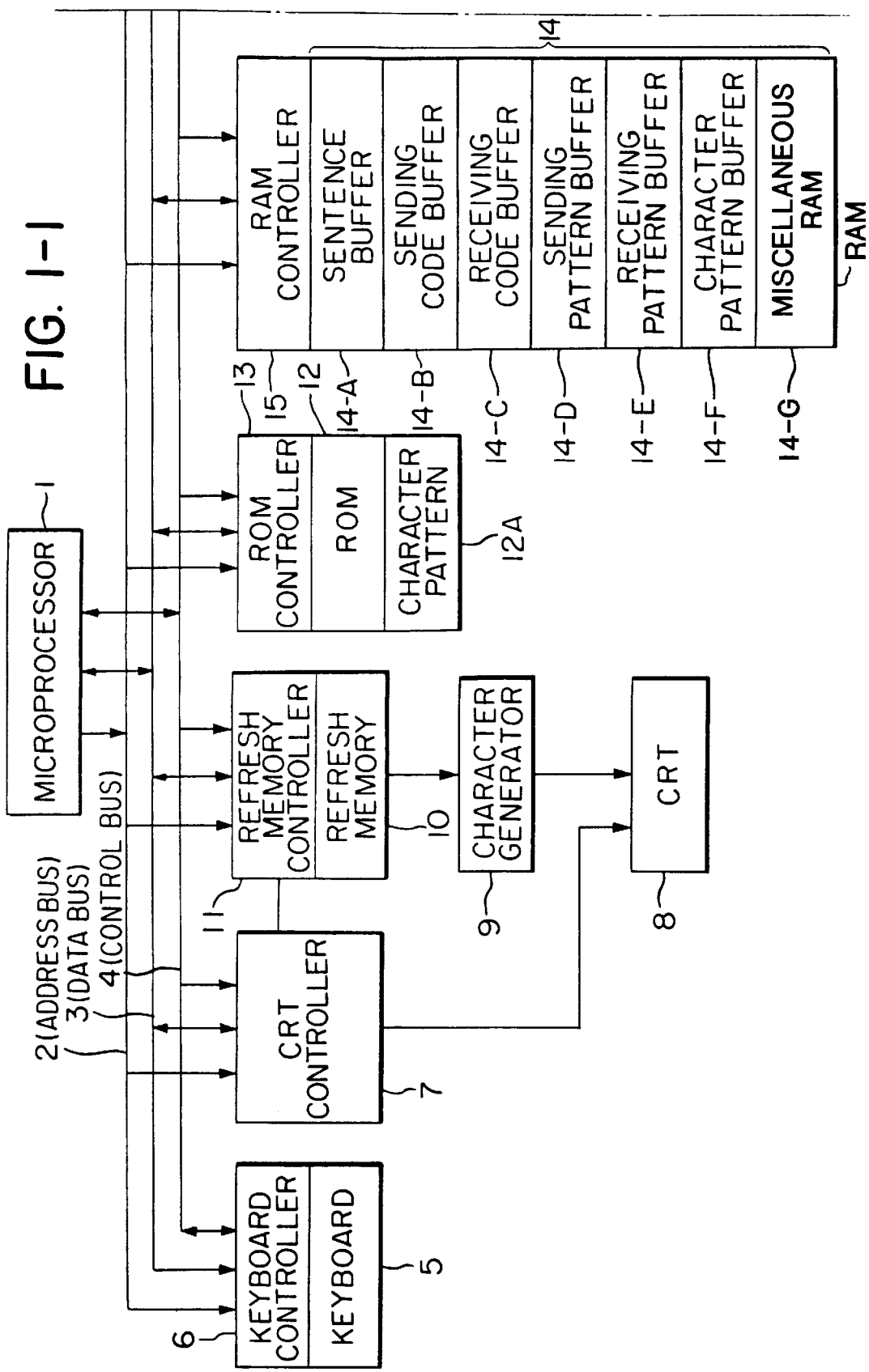
Figure 2B:
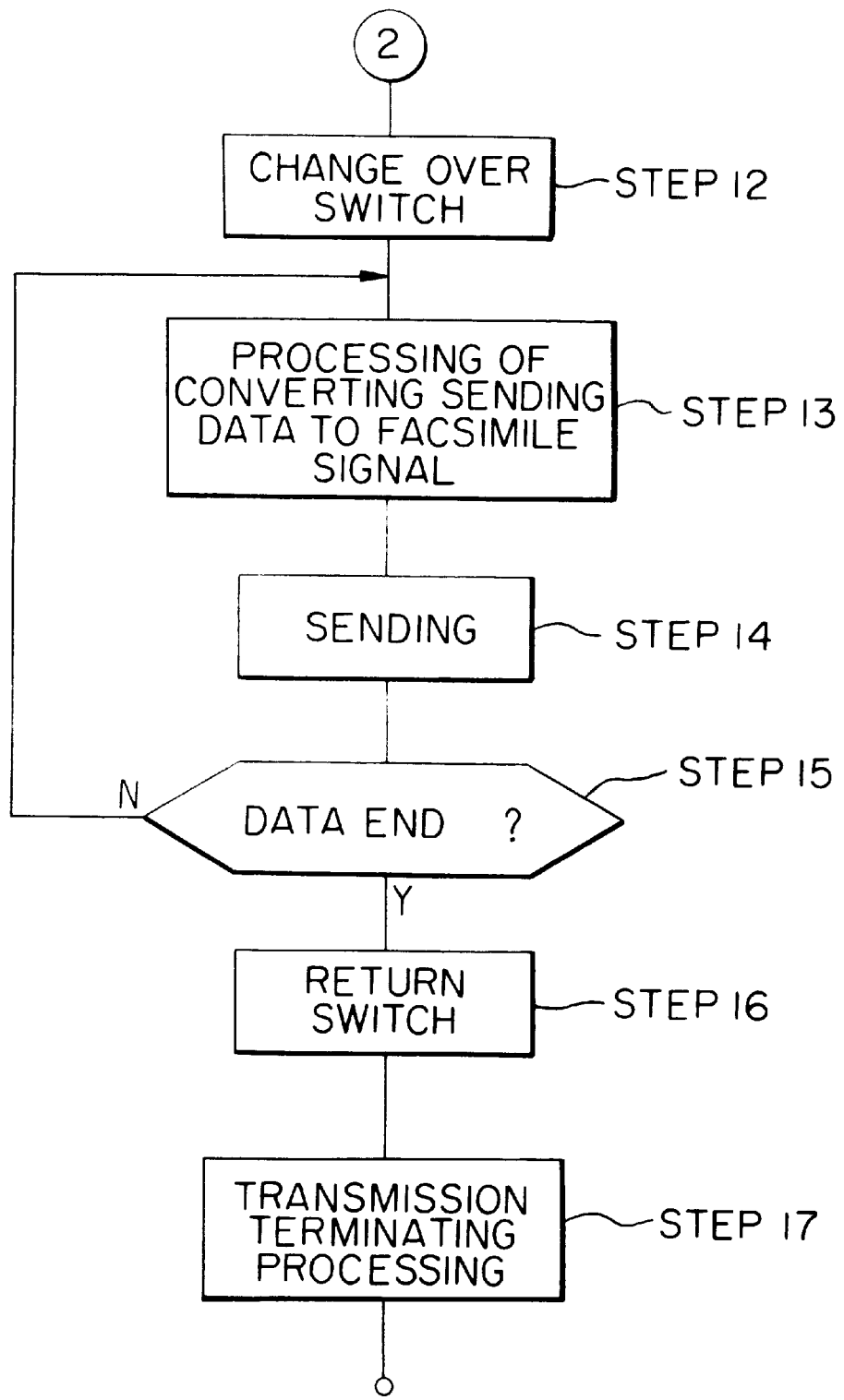

FIG. 1 shows a block diagram of one embodiment of the present invention which is described in the context of a word processor communicating with another word processor or facsimile apparatus. Numeral 1 denotes a microprocessor and numeral 2 denotes an address bus for specifying addresses of I/O memories. Numeral 3 denotes a data bus which is a bilateral bus for transferring various data. Numeral 4 denotes a control bus for sending timing signals for read/write operation of the memories, acceptance of an interruption and setting of data. Numeral 5 denotes a keyboard which comprises alphabetic keys, HIRAGANA keys, KATAKANA keys, a cursor key and a monitor line cursor key. Numeral 6 denotes a keyboard controller which encodes data entered from the keyboard 5 and sends an interrupt signal to the control bus 4. Numeral 7 denotes a CRT controller which controls a CRT device 8, a character generator 9, a refresh memory 10 and a refresh memory controller 11. The display device 8 can display information in the same manner as a conventional television. The character generator 9 sequentially produces lines of a character pattern in response to a coded input such as line address of the coded character pattern. The refresh memory 10 stores character codes to be displayed on the CRT device 8 and repetitively produces the character codes when the CRT controller 7 instructs the display. The refresh memory controller 11 controls a refresh cycle for the CRT display and the read/write operation by the microprocessor 1 in accordance with an instruction from the CRT controller 7.

Numeral 12 denotes a read-only memory (ROM) which stores control procedures shown in FIGS. 2A, 2B, 3A and 3B and various processing steps. Numeral 12A denotes a character pattern memory from which a character pattern to be printed is obtained. Alternatively, it may be obtained from the character generator 9. Numeral 13 denotes a controller for the ROM 12, and numeral 14 denotes a random access memory (RAM) which temporarily stores various data. For example, the RAM 14 comprises a sentence buffer 14-A for storing input sentences, a sending code buffer 14-B, a receiving code buffer 14-C, a sending pattern buffer 14-D, a receiving pattern buffer 14-E, a character pattern buffer 14-F and a temporary miscellaneous memory or miscellanous RAM 14-G. Numeral 15 denotes a controller for the RAM 14. Numeral 16 denotes a floppy disc driver, numeral 17 denotes a controller for the floppy disc driver 16, numeral 18 denotes a dot printer, numeral 19 denotes a controller for the dot printer 18, and numeral 20 denotes a stepping data communication controller (ADC) which transmits and receives coded data. Numeral 21 denotes a modulator (MODEM) for frequency shift modulating the serialized data from the ADC 20, numeral 22 denotes a converter (FXMD) for converting a signal to a facsimile signal and converting the facsimile signal to a pattern signal, numeral 23 denotes a network controller (NCU) which controls the generation of a dialing signal and the connection of a line, numeral 24 denotes a switch for connecting the NCU 23 and the MODEM 21 or the FXMD 22 and selectively connects either one of the MODEM 21 or the FXMD 22 by an instruction from the microprocessor 1, and numeral 25 denotes a dial controller which sends a dial data to the NCU 23 when a station is to be called. A suitable network controller NCU 23 is described in a manual for those in charge of construction of data communication published by the Japan Data Communication Association, the first edition of which was published Jul. 31, 1975, and the first edition of which was published Apr. 20, 1980. NCU 23 may take the form of the automatic switching system 52 shown in the U.S. Pat. No. 3,705,953 to Lemelson.

The present word processor is operated by the input from the keyboard 5. When the input is applied from the keyboard 5, an interrupt signal is supplied to the microprocessor 1 and the various control operations start in accordance with the control procedures stored in the ROM 12.

The operation will now be explained with reference to the drawings. When the transmission of data is instructed from the keyboard 5, the microprocessor 1 starts to operate in accordance with the procedures stored in the ROM 12. In a step 1 of FIG. 2A, a number of a partner station is sent to the NCU 23 by the dial controller 25 and the partner station is called by automatic dialing. At an initial state, the NCU 23 is connected to the MODEM 21 by the switch 24. In a step 2, the microprocessor 1 carries out the process of starting the communication through the ADC 20 and the MODEM 21 in accordance with the procedures stored in the ROM 12.

In a step 3, it is determined if the partner station is a facsimile apparatus or a word processor. If it is not either, an error process is carried out in a step 4. If the partner station is a word processor, a data in the sending code buffer 14-B is examined in a step 5 to determine if the data to be transmitted is character code or pattern information. If it is the character code, it is transmitted to the partner station in a step 6 and the process proceeds to a step 7. If it is the pattern information, the data in the sending code buffer 14-B specifies the corresponding pattern in the character pattern buffer 14-F. In a step 8, a pattern identification signal for transmitting the pattern signal is sent and informs the partner station that the pattern signal will be transmitted. In a step 9, the character pattern in the character pattern buffer 14-F is transmitted. It should be understood that the pattern may be a graphic pattern. In a step 10, a pattern transmission termination signal is sent to inform of the termination of the pattern transmission. In the step 7, it is determined if the transmitted data is the last one and if there are remaining data the process goes back to the step 5 and the same process as described above is repeated. If it is the last data, transmission termination process is carried out in a step 11.

In the step 3, if it is determined that the partner station is a facsimile apparatus, the switch 24 is switched to the FXMD 22 in a step 12 and the character pattern specified by the sending code buffer 14-B is read out from the character patterns in the ROM 12A or the character pattern buffer 14-F in a step 13, and it is converted to a facsimile transmitting signal which is then transmitted by the FXMD 22 in a step 14. In a step 15, unless the data is the last one, the process goes back to the step 13 and the same process as described above is repeated. If it is the last data, the switch 24 is switched to the MODEM 21 in a step 16 and transmission termination process is carried out in a step 17. In this manner, the transmission to a facsimile apparatus or another word processor is carried out.

Figures 2, 3A:
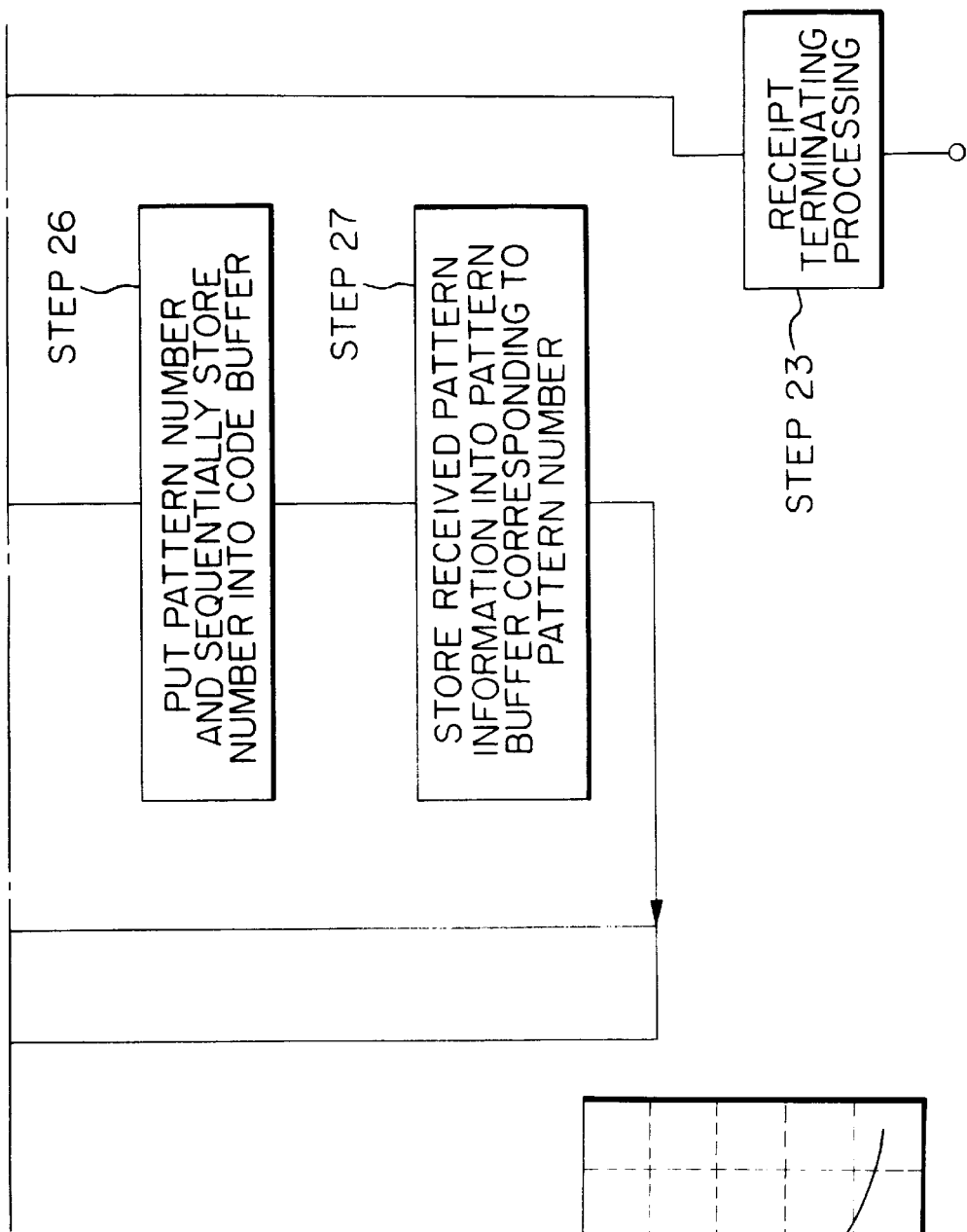

The receiving operation will now be explained. When a signal is received from a facsimile apparatus or another word processor, a step 20 of FIG. 3A is processed to determine if the partner station is a facsimile apparatus or a word processor. If it is not either, the process proceeds to a step 21 to carry out an error process. If it is a word processor, it is determined in a step 22 if the signal from the partner station is the transmission termination signal, and if it is the transmission termination signal, a receipt termination process is carried out in a step 23. In other cases, it is determined in a step 24 if the received data is the character code or a pattern transmission identification code, and if it is the character code it is loaded to the receiving code buffer 14-C in a step 25. If it is the pattern transmission identification code, the pattern is numbered in a step 26 so that the number specifies a vacant area in the character pattern buffer 14-F and the number code is loaded to the receiving code buffer 14-E. In a step 27, the received pattern information is loaded to the vacant area of the character pattern buffer 14-F and the process goes back to the step 22 to repeat the same process as described above.

Figure 4:
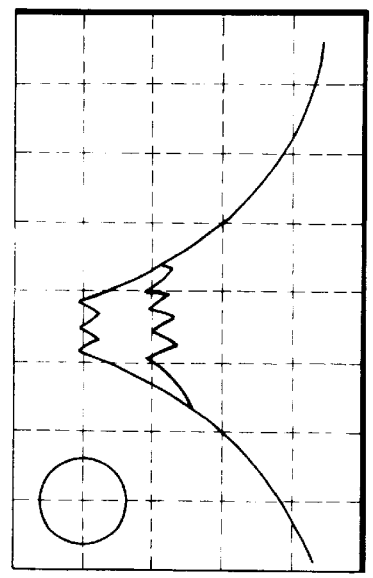
FIG. 4 illustrates division of a pattern.
Figure 3B:
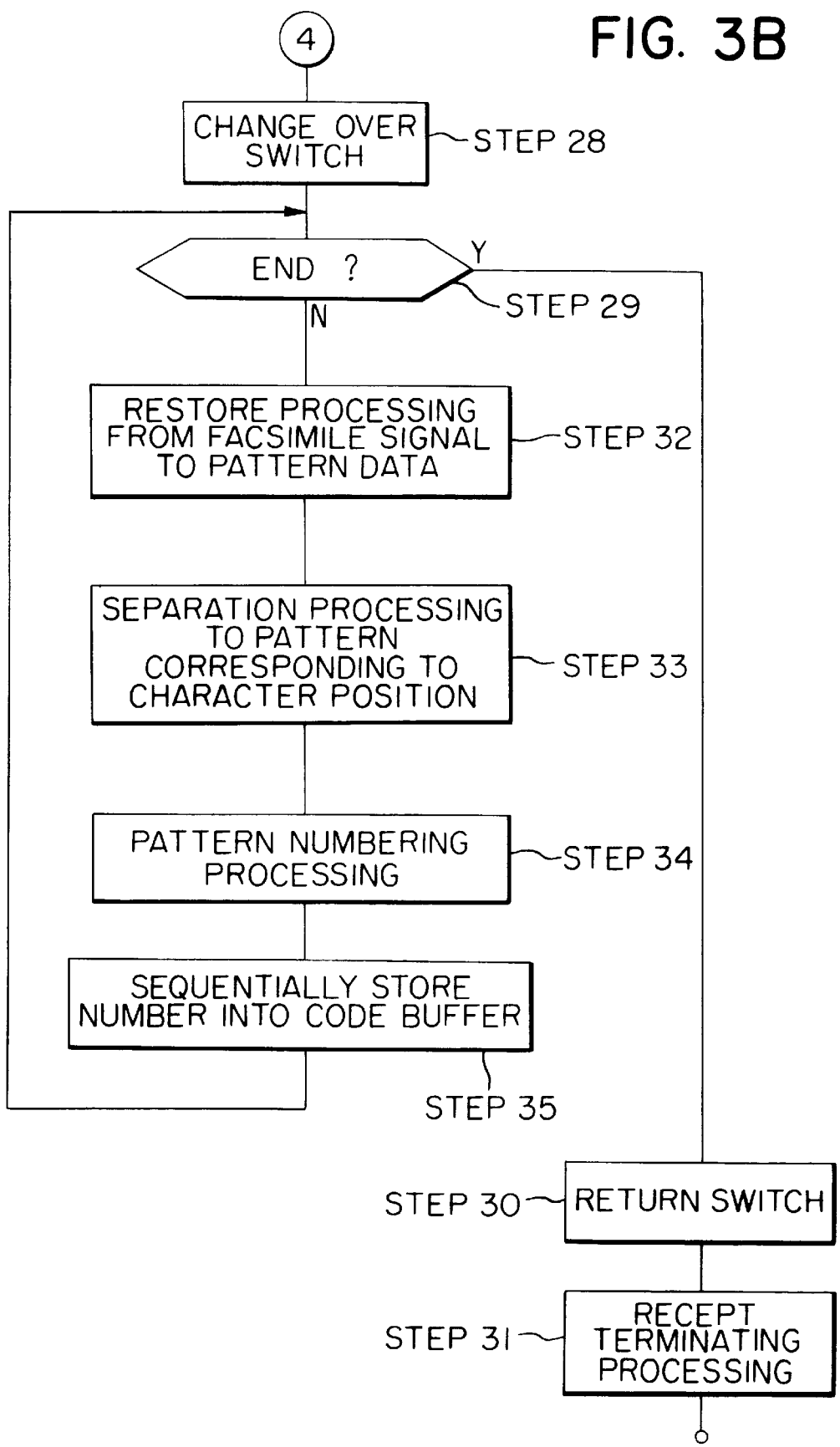

On the other hand, if it is determined in the step 20 that the partner station is a facsimile apparatus, the switch 24 is switched to the FXMD 22 in a step 28, and it is determined in a step 29 if it is the end, if it is the end the switch 24 is switched back to the MODEM 21 in a step 30 and a receipt termination process is carried out in a step 31. If it is not the end, the received facsimile signal is converted to pattern data in a step 32 and the pattern data is loaded to the receiving pattern buffer 14-E. The pattern data is divided into patterns corresponding to character positions in a step 33. Referring to FIG. 4, if a picture image shown there is reproduced from a facsimile apparatus, the image is divided to sections shown by broken lines and the respective sections are numbered in a step 34 and the numbers are loaded to the receiving code buffer in a step 35. As described above, the facsimile signal is converted to the picture image, which is divided and encoded and then loaded into the receiving code buffer. When the information is to be printed by the printer 18, the image can be dot-printed in the same routine as the characters are printed. More particularly, when the data in the receiving code buffer is to be printed, if the data is the character code, the pattern corresponding to the character code is read from the character pattern buffer 12-A and supplied to the dot printer, and if the data is the pattern number code, the corresponding pattern is read from 14-E or 14-F and supplied to the dot printer.

As described hereinabove, the present invention allows effective communication with facsimile apparatus or another word processor.

What is claimed is:

1. An information processing apparatus for transmitting information to a receiving apparatus comprising:

input means for inputting character information;

checking means for outputting and transmitting an identification signal via a network to the receiving apparatus, said checking means determining from the receiving apparatus whether or not the receiving apparatus is able to receive character information from said input means;

changing means, connected to said checking means and responsive to said determination that the receiving apparatus is unable to receive the character information by said checking means, for changing a form of the information to a form that said receiving apparatus is able to receive in the event that the information is of a form other than that which the receiving apparatus is able to receive, said changing means reading out character image data from a memory for storing character image data corresponding to the character information to change a form of the information;

converting means for converting the character image data into facsimile compatible data; and transmitting means for transmitting the facsimile compatible or the character information via the network.

2. An information processing apparatus according to claim 1, further comprising memory means for storing character information from said input means.

3. An information processing apparatus according to claim 2, further comprising pattern memory means for storing a character pattern corresponding to said character information.

4. An information processing apparatus according to claim 1, wherein said input means comprises a keyboard.

5. An information processing apparatus according to claim 1, wherein when said transmitting means transmits a character pattern of the character information, said transmitting means transmits discrimination information for discriminating whether information to be transmitted is the character information or the character pattern of the character information.

6. An information processing apparatus according to claim 5, further comprising discrimination means for discriminating whether information to be transmitted is the character information or the character pattern of the character information.

7. A data communication apparatus for transmitting character code data and image data to another communication apparatus via a communication line, comprising:

calling means for calling the another communication apparatus;

first discrimination means for effecting a procedure for starting communication with the another communication apparatus called by said calling means prior to data transmission and for discriminating a data processing function of the another communication apparatus;

second discrimination means for discriminating whether data to be transmitted is character code data or image data; and control means for controlling the transmission of character code data and image data stored in a memory in accordance with the discrimination by said first and second discrimination means, said control means converting the character code data and image data stored in said memory into facsimile compatible data and for transmitting the facsimile compatible data when said first discrimination means discriminates that the another communication apparatus is a facsimile apparatus having an image data processing function, and transmitting character code data and image data previously stored in said memory in accordance with the discriminating by said second discrimination means when said first discrimination means discriminates that the another communication apparatus is an apparatus for processing both character code data and image data, said control means having transmitting means, when said control means transmits via the communication line said both character code data and image data, for transmitting discrimination information for discriminating said character code data and said image data thereto.

8. A data communication apparatus according to claim 7, further comprising a keyboard for entering character code data to be stored in said memory.

9. A data communication apparatus for transmitting image data and character code data to another communication apparatus through a communication line comprising:

image data processing means for processing image data;

character code data processing means for processing character code data;

first discrimination means for discriminating the data processing function of the another communication apparatus;

second discrimination means for discriminating the type of data to be transmitted;

first transmission means for transmitting image data when said first discrimination means discriminates that the another communication apparatus is a facsimile apparatus having an image data processing function; and second transmission means for transmitting character code data when said first discrimination means discriminates that the another communication apparatus is an apparatus capable of processing both character code data and image data, and when the type of data to be transmitted is discriminated as character code data by said second discrimination means, and for transmitting image data and discrimination data thereof when said second discrimination means discriminates that the type of data to be transmitted is image data, wherein when the another communication apparatus is a facsimile apparatus having an image data processing function, said second transmission means transmits data of different types as image data without discrimination data, and wherein when the another communication apparatus is an apparatus capable of processing both character code data and image data, said data communication apparatus transmits data of different types as data of different types.

* * * * *

UNITED STATES PATENT AND TRADEMARK OFFICE
CERTIFICATE OF CORRECTION

PATENT NO.   :   6,134,305

DATED         :   October 17, 2000

INVENTOR(S):   SHUNPEI TAKENAKA, et al.                    Page 1 of 2

It is certified that error appears in the above-identified patent and that said Letters Patent is hereby corrected as shown below:

ON THE COVER PAGE, AT [56], References Cited, U.S. PATENT DOCUMENTS:

"Monfevecchio" should read --Montevecchio--.

COLUMN 1:
Line 23, "instance" should read --instance,--.

COLUMN 2:
Line 19, "address" should read --addresses--.

UNITED STATES PATENT AND TRADEMARK OFFICE
CERTIFICATE OF CORRECTION

PATENT NO. : 6,134,305

DATED : October 17, 2000

INVENTOR(S): SHUNPEI TAKENAKA, ET AL.

It is certified that error appears in the above-identified patent and that said Letters Patent is hereby corrected as shown below:

COLUMN 4:
Line 7, "end, if" should read --end. If--.

Signed and Sealed this

Twenty-ninth Day of May, 2001

Attest:

NICHOLAS P. GODICI

Attesting Officer     Acting Director of the United States Patent and Trademark Office